Aug. 29, 1961     C. J. PIERCE, JR     2,997,930
DEVICE FOR FORMING AND LOCKING FOLDING BOX CORNERS
Filed Sept. 1, 1959     11 Sheets-Sheet 1

INVENTOR.
Chester J. Pierce, Jr.
BY
Howard G Russell
his ATTORNEY

INVENTOR.
Chester J. Pierce, Jr
BY
Howard G Russell
his ATTORNEY

Aug. 29, 1961 C. J. PIERCE, JR 2,997,930
DEVICE FOR FORMING AND LOCKING FOLDING BOX CORNERS
Filed Sept. 1, 1959 11 Sheets-Sheet 8

INVENTOR.
Chester J. Pierce, Jr
BY
Howard G. Russell
his ATTORNEY

INVENTOR.
Chester J. Pierce, Jr.
BY Howard G. Russell
his ATTORNEY

Aug. 29, 1961 C. J. PIERCE, JR 2,997,930
DEVICE FOR FORMING AND LOCKING FOLDING BOX CORNERS
Filed Sept. 1, 1959 11 Sheets-Sheet 10

INVENTOR.
Chester J. Pierce, Jr.
BY
Howard G. Russell
his ATTORNEY

United States Patent Office 2,997,930
Patented Aug. 29, 1961

2,997,930
DEVICE FOR FORMING AND LOCKING FOLDING BOX CORNERS
Chester J. Pierce, Jr., Palo Alto, Calif., assignor to Baljak Corporation, Wilmington, Del., a corporation of Delaware
Filed Sept. 1, 1959, Ser. No. 837,371
3 Claims. (Cl. 93—51)

This invention relates to improvements in devices for converting flat folding box blanks into box shape and locking the box corners in assembled position without adhesive, staples, or other fastening elements by interlocking a certain flap or tab on one box wall or panel with an appropriately shaped slit or aperture in another box wall or panel.

Most gluelessly interlocked boxes are not leak proof by reason of the presence of slits, cuts, or apertures in the walls. However, certain improvements have been made in the box design which avoid slits, cuts, and apertures in the walls and result in a box which is capable of holding liquid contents up to its top edge. The present invention is particularly useful in connection with the forming and locking of boxes of the latter improved type.

In most forms of gluelessly interlocked boxes the locking elements have the form of an abutment flap which is threaded, edge first, through a slit by a motion substantially in the plane of the flap. There exists another type of interlock in which a tab is pressed through an aperture by a force acting on the tab substantially normal to the tab surface so that the tab is displaced substantially parallel to itself. The present invention is particularly useful in engaging locks of the latter type.

In high speed production difficulties are experienced with locks which require a tab to be pressed through an aperture by a motion substantially normal to the plane of the tab, and it is normally necessary to perform this locking operation after completion of the box forming operation at a time when the box has come to rest. The box forming operation is generally performed by a plunger which forces the flat blank through the die to erect the wall panels with respect to the box bottom.

The present invention permits the locking operation to be performed while the box blank is in motion as it is being advanced through the die by the plunger. According to the invention a locking force is exerted on the tab in a direction substantially normal to the tab, but the locking force is moved substantially parallel to itself so as to follow the motion of the plunger. In the meantime, the panel comprising the aperture through which the tab is to be pressed is supported adjacent the aperture as the box blank advances through the die.

The device for engaging the lock must, of necessity, perform a complex motion which comprises a first inward component substantially normal to the apertured box panel or wall and a second downward component to follow the downward work stroke of the plunger.

A tucker element or finger which performs the tucking operation may therefore move on an arc directed inwardly and downwardly, and it may withdraw by a continued motion extending downwardly and moving away from the plunger, or by a return motion which is identical with the locking motion but extends in the reverse direction, that is, on an arc outwardly and away from the completed box lock. In the event an arcuate motion is chosen it would seem preferable to continue the motion in order to disengage the tucker finger from the box and permit removal of the box from the plunger without damage by the tucker finger. This, however, necessitates an extended plunger motion, since the plunger must continue to travel beyond the position in which the box is completely formed and locked. This involves loss of time and limitation of the output rate.

For this reason, I prefer the embodiment of the invention which guides the tucker element or finger on a downwardly and inwardly inclined path. In this case the box and the plunger may come to rest at the moment when the box is completely formed and locked. The box may be arrested positively to prevent it from following the plunger on the return stroke and the plunger and the tucker element or elements may be withdrawn along the same path on which they entered, but in the opposite direction. The plunger stroke is thus kept relatively short which is an important feature when a high output rate is of the essence.

The objects, features and advantages of this invention will appear more fully from the detailed description which follows accompanied by drawings showing, for the purpose of illustration, the aforesaid preferred embodiment of the invention.

The invention also resides in certain new and original features of construction, combination of elements hereinafter set forth and claimed.

Although the characteristic features of this invention which are believed to be novel will be particularly pointed out in the claims appended hereto, the invention itself, its objects and advantages and the manner in which it may be carried out, may be better understood by referring to the following description taken in connection with the accompanying drawings forming a part of it in which:

FIG. 1 also shows the blank feeder which is about to deposit a flat blank in the mechanism;

Figure 1:
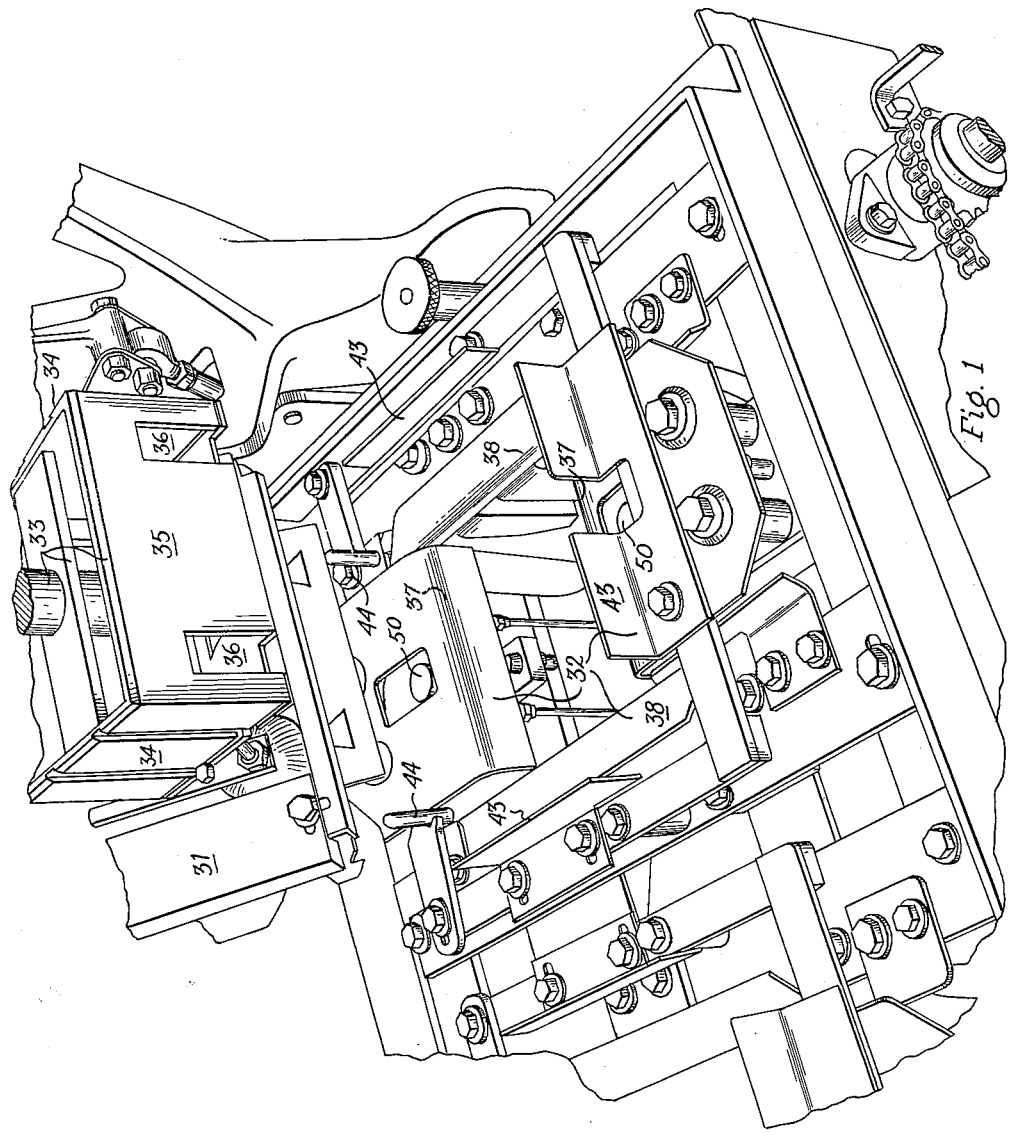
FIG. 1 is a perspective view of a plunger and die mechanism incorporating the present invention.

In the following description and in the claims various details will be identified by specific names for convenience. The names, however, are intended to be generic in their application. Corresponding reference characters refer to corresponding parts in the several figures of the drawings.

The drawings accompanying and forming part of this specification disclose certain details of construction of a preferred form of the invention for the purpose of explanation of its broader aspects, but it is understood that details may be modified in various respects without departure from the principles of the invention and that the invention may be incorporated in other structural forms than the preferred form illustrated here.

An understanding of the folding and locking device and of the method which the illustrated device carries out will be facilitated by a brief consideration of the blank which the device is designed to fold into box form and lock. The blank is sufficiently well visible in FIG. 3, to which reference will be first made.

The blank comprises a bottom panel 11 to which end wall panels 12 and 13 are articulated along end fold lines 14 and 15. A front wall panel 16 and a back wall panel 17 are articulated to the bottom panel along front and back fold lines 18 and 19.

The wall panels are interconnected at the corners by gusset panels 20 across which a diagonal gusset fold line 21 extends. A lock tab 22 is articulated to each gusset panel along a tab fold line 23 which extends across a narrow neck portion of a dimension less than the width of the tab. After formation of the box corner each tab 22 is forced through an aperture formed by a series of cuts forming substantially a figure H. These cuts are clearly visible at 24 and are predominantly located in a cover panel 25 for the locks at the back of the box and in front flange 26 for the locks at the front of the box. The front flange is partially obscured by a portion of the folding mechanism in the figure, but it will be sufficient to state that its H cuts correspond in all particulars to the one seen in the cover panel 25.

The blank further comprises dust flaps 27 and 28 articulated to the end wall panels 12 and 13 along dust flap fold lines 29 and 30. The dust flaps perform no specific function in the locking of the box body and their presence or absence is of no moment, as far as the invention is concerned.

Turning now to the mechanism for handling the blank and forming it into box shape, three principal mechanical units are visible in FIG. 1, a feeder 31 whose purpose it is to supply a flat blank, a die 32 through which the blank is forced, and a plunger 33 which forces the blank through the die, thereby folding the box walls into upright position with respect to the box bottom. The plunger finally pushes the completed box out through the open-bottomed die 32, whereafter the box is carried away by a suitable conveyor mechanism.

The plunger 33 is in essence a block, hollow to reduce its mass, with end surfaces 34 against which end wall panels of the blank are folded, and front and rear surfaces 35 against which the front and back wall panels of the blank are folded. The front and rear surfaces support the front and back walls of the box, except where the front and rear surfaces are recessed at 36. The recesses underlie the H-shaped cuts 24, as will later be seen, and permit lock tabs 22 to be flexed into a position beyond the front and rear surfaces 35.

The die 32 comprises lateral blank folding portions 37 which extend substantially parallel to the front and rear surfaces 35 of the plunger. Blank folding end portions 38 extend substantially parallel to the end surfaces 34 of the plunger. The throat of the die, defined by the lateral and end blank folding portions, is substantially rectangular and the die is open at the bottom, as seen particularly well in FIG. 12, so that the completed blank can be discharged through its lower portion. This distinguishes the illustrated die from forming structures of the so-called pocket type into which blanks are forced from the top, whereafter the finished box must also be removed from the top, a rather slow and awkward procedure.

Figure 2:
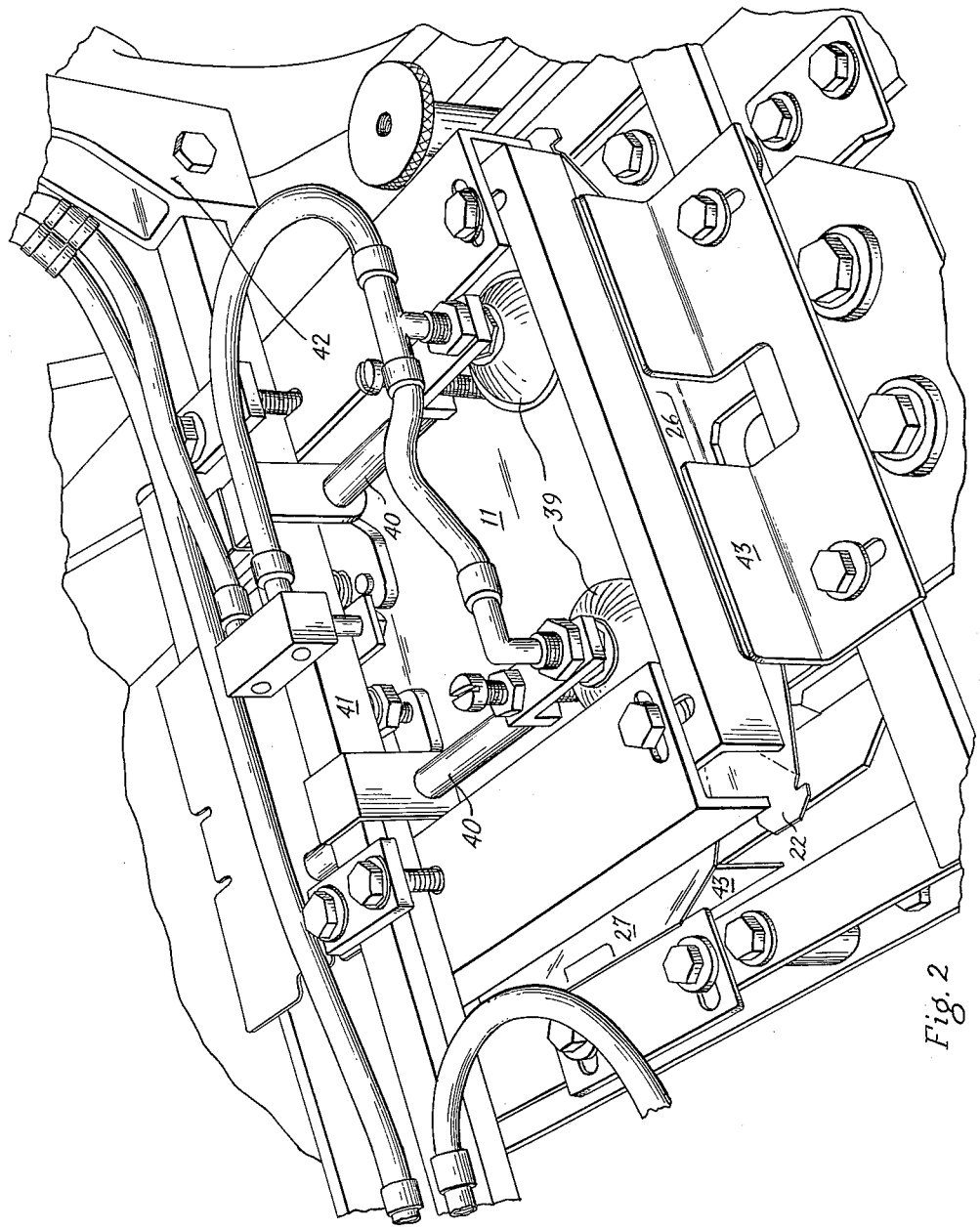
FIGS. 2 to 11 are perspective views illustrating successive stages in the formation of the box and its lock.

The feeder mechanism 31 which deposits flat blanks on the die is best seen in FIG. 2. The feeder removes flat blanks, one by one, from a suitable magazine (not shown) and carries them to the die. The feeder comprises suction cups 39 attached to arms 40 clamped to a feeder bar 41. The feeder bar is held between lateral arms 42 which impart a complex motion to the feeder bar and cups. Particulars of the feeder are disclosed in the patent to Lefief, 2,805,060 of September 3, 1957. For an understanding of the present invention it is sufficient to state that the feeder 31 first moves the blank along an arcuate path, as shown in FIG. 1, into a position above the die 32, whereafter the feeder moves in the direction of the die axis and places the blank between appropriately set guide surfaces 43 and guide pins 44 (FIG. 1). In doing so, the feeder may perform a prebreaking or prefolding operation by folding the dust flaps 27, 28 and the front flange 26 slightly with respect to the remainder of the blank. This operation is disclosed in greater detail and claimed in the patent to Baker et al., 2,655,843 of October 20, 1953.

Figure 3:
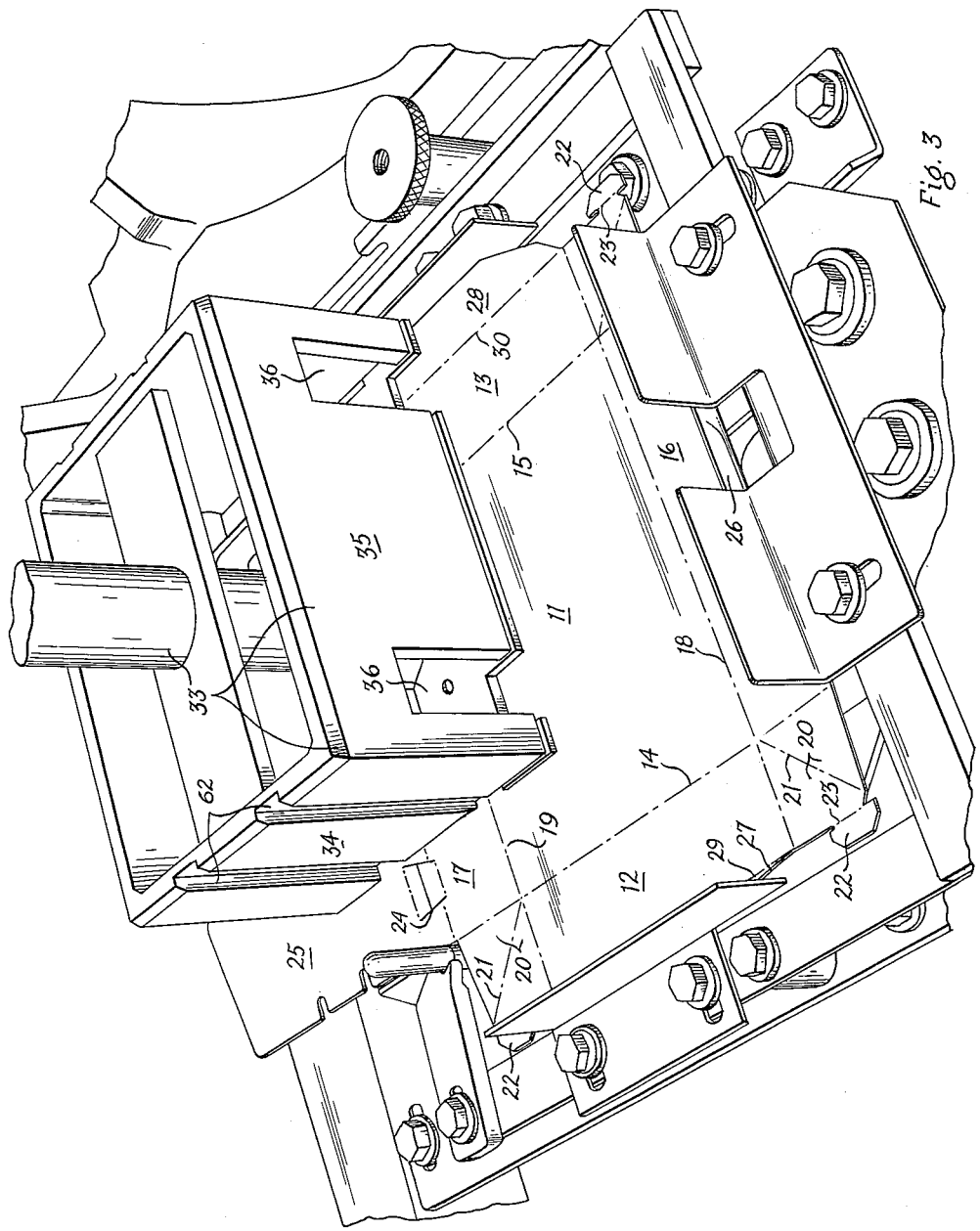
Figure 4:
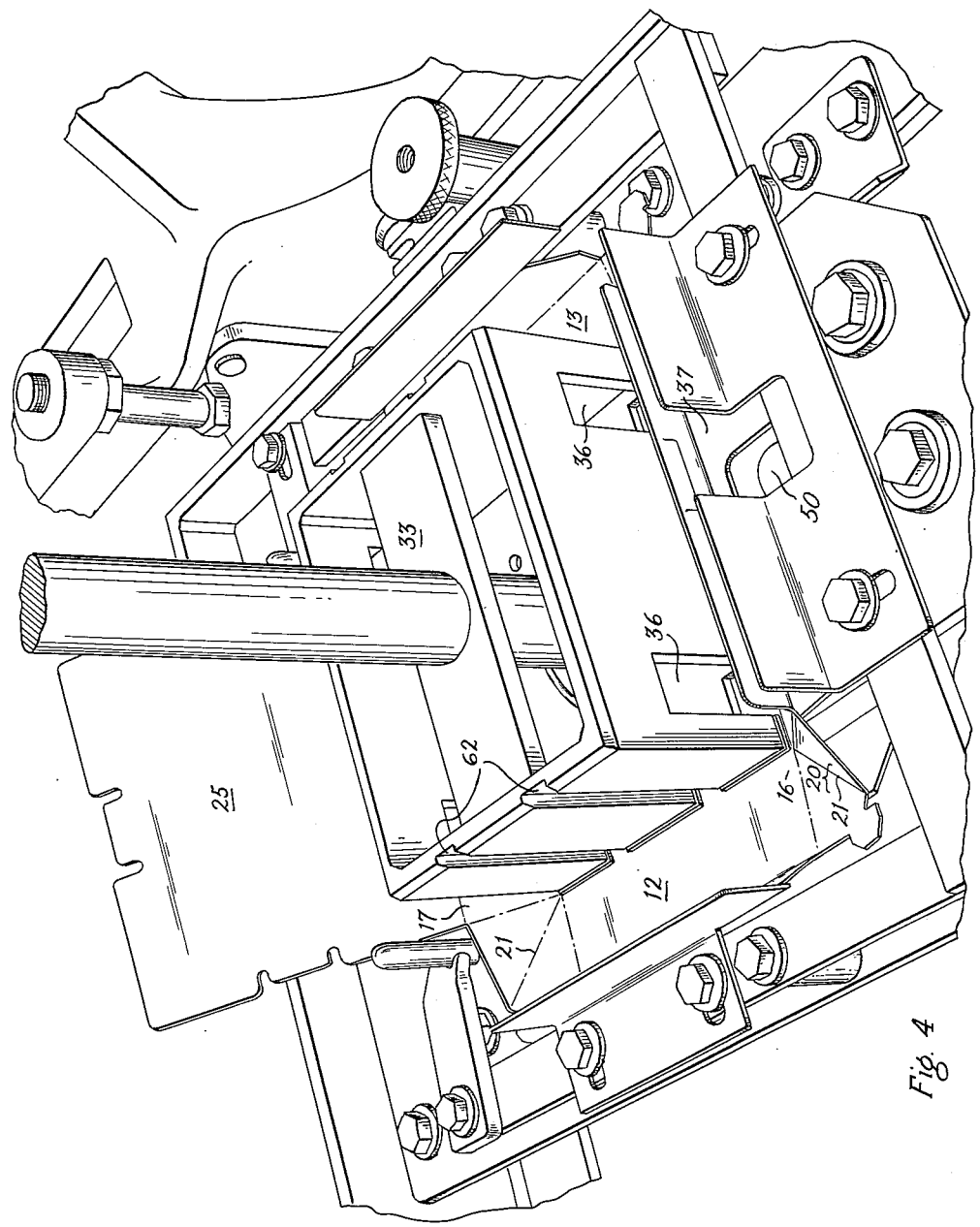

After placing the blank over the mouth of the die the suction cups 39 release the blank, whereafter the feeder returns to pick up the next blank. In doing so the feeder moves out of the way of the plunger 33 which now descends, as shown in FIG. 3. The descending plunger 33 seats on the bottom panel 11 and begins to force the box blank into the throat of the die 32, as shown in FIG. 4.

The lateral blank folding portions 37 are set slightly in advance of the end blank folding portions 38 (not visible in FIG. 4), as a result of which the front and rear walls 16 and 17 are folded into upright position before the end wall panels 12 and 13. This causes the gusset panels 20 to crease at their diagonal fold lines 21. The cover panel 25 follows the back wall panel 17 and remains in substantially the same plane as the latter.

Figure 5:
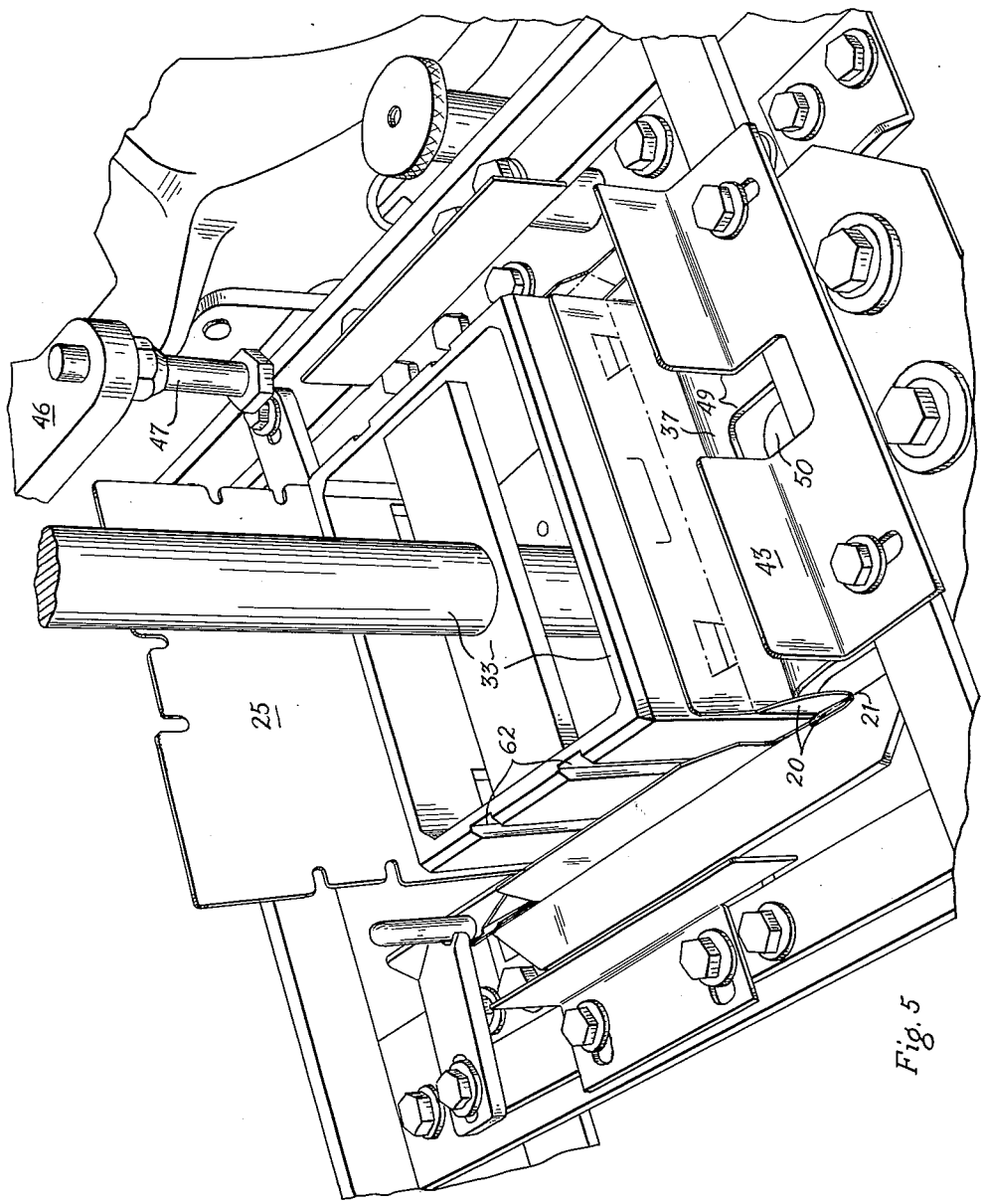

FIG. 5 illustrates an advanced phase of the folding operation in which the gusset panels 20 are almost folded flat at their diagonal fold lines 21.

Figure 6:
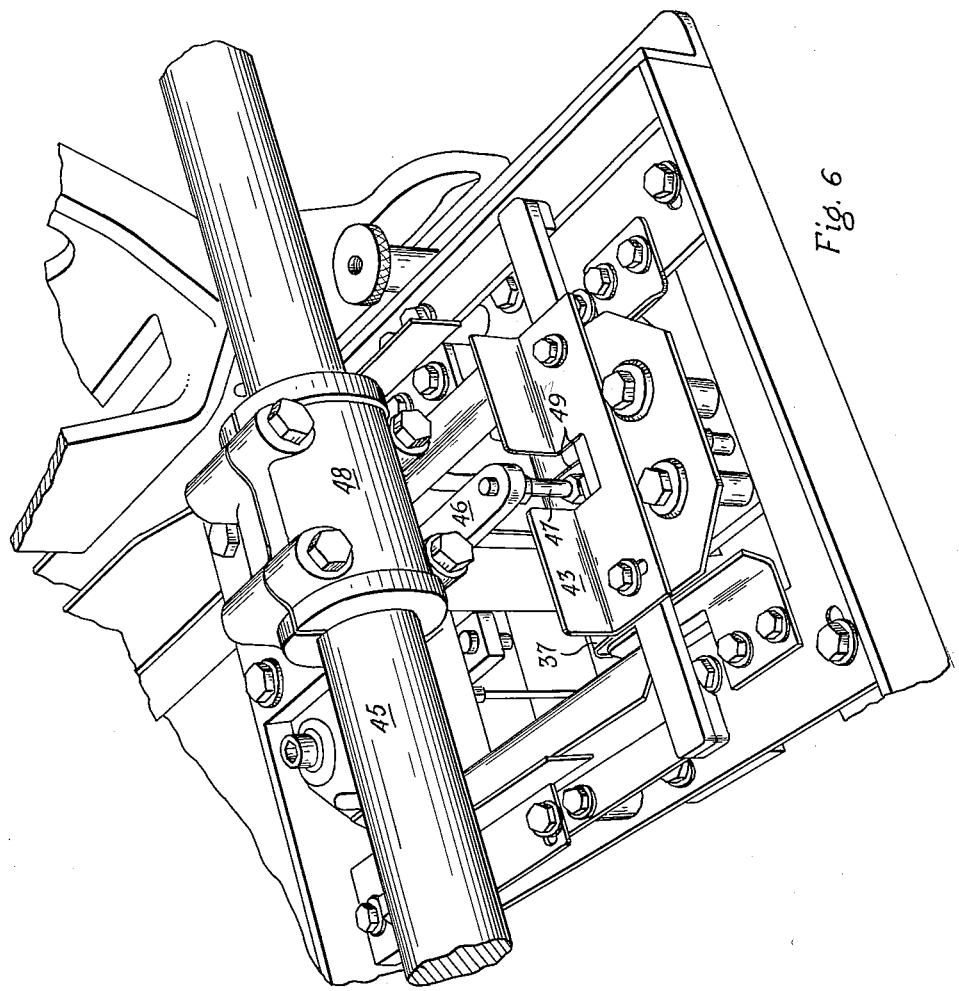

In the position shown in FIG. 6 the box blank has disappeared within the die and the transverse plunger drive bar 45, to which the plunger is clamped at 48, is nearing its lowest position in its reciprocating up and down motion. It will be noted that the plunger is fitted with a cross arm 46 carrying an adjustable stud 47 at each end. The studs enter between cutouts 49 in the die surface 43 and in the lateral blank folding portions 37 underneath, and are about to engage nylon caps 50 of an actuating mechanism later to be described.

Figure 7:
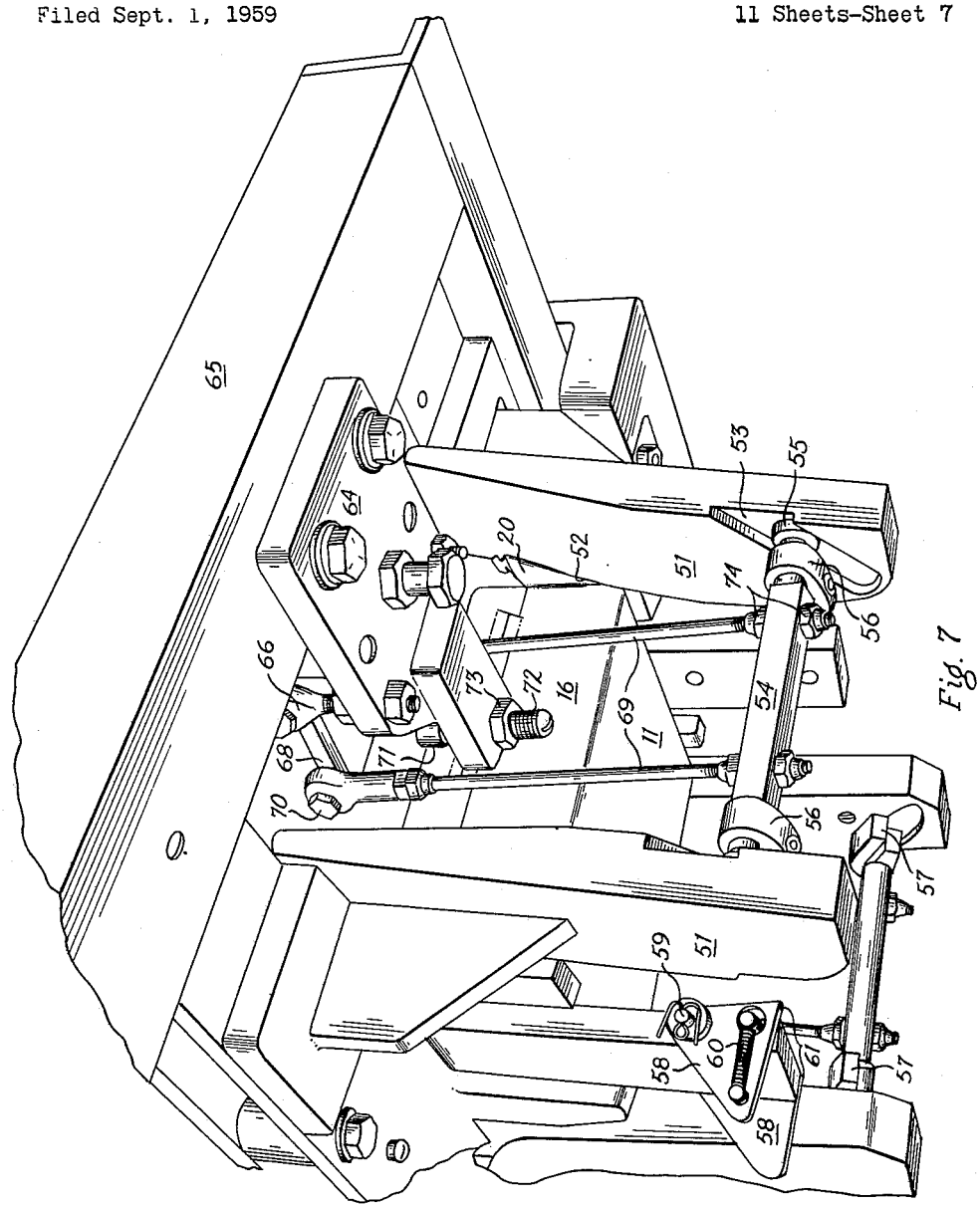

The subsequent operations are best described by referring to FIGS. 7 to 11 giving views of the die from below. FIG. 7 shows the box in a position in which the corner gussets 20 are about to be folded over the front and back wall panels 16 and 17 respectively. Only the front wall panel 16 is visible in FIG. 7. The position which the box occupies in FIG. 7 corresponds to a phase of operation later than that shown in the top view of FIG. 5 and somewhat prior to the position shown in the top view of FIG. 6.

Figure 8:
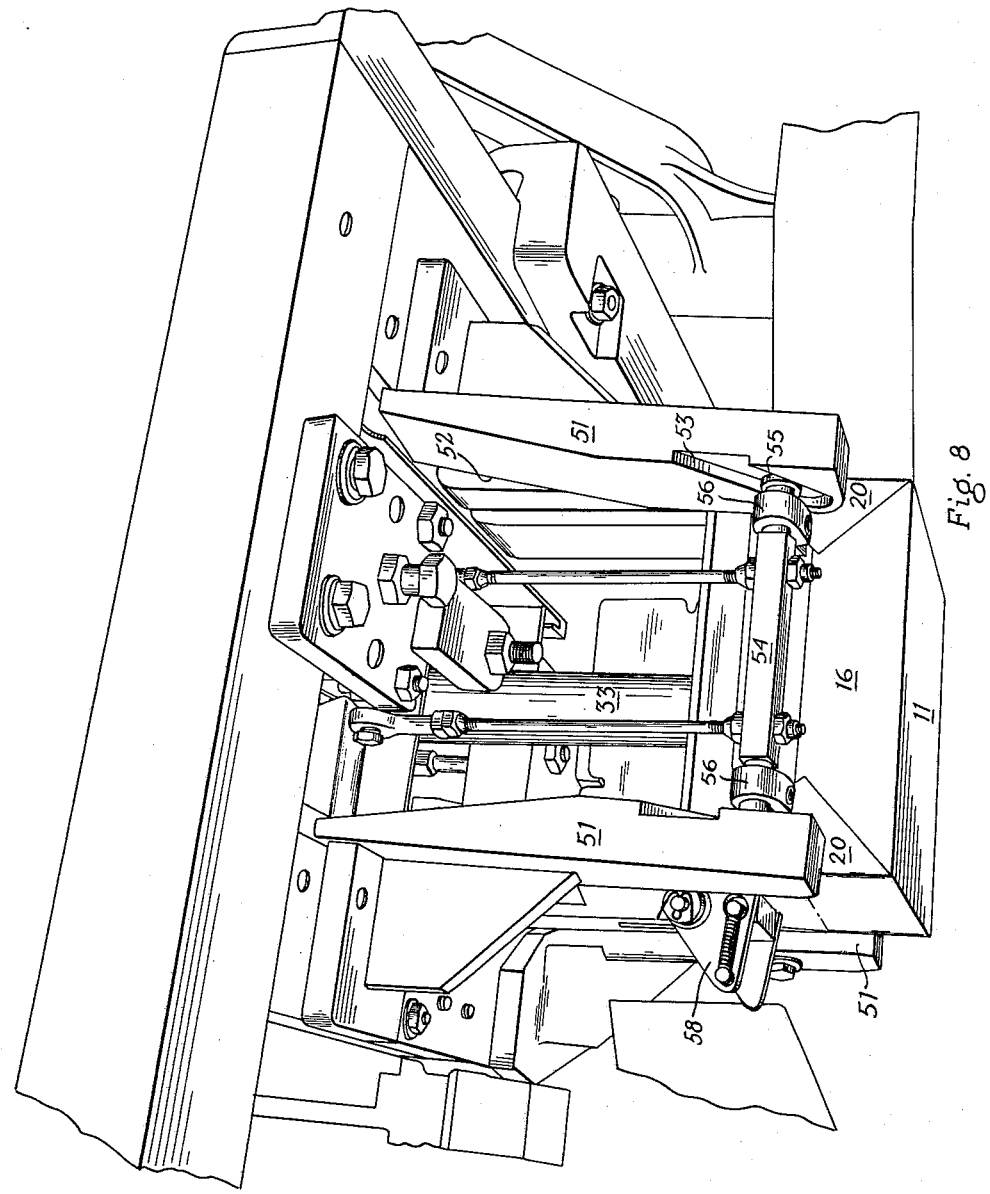

In the position shown in FIG. 8 the folding of the gusset panels 20 is completed, but the gusset panels are still unsecured and would open up, if the box were discharged from the die at this point. The gussets are held between four corner posts 51 of the die structure. These corner posts have a substantially rectangular cross section and perform a variety of functions. It is seen that the corner posts taper upwardly thereby presenting slanted edges 52 which engage and guide the corner gussets 20 into the position shown in FIG. 8. FIG 7 illustrates this portion of the operation particularly clearly. After the folding of the corner gussets, the surfaces of the posts 51 facing the front and back walls 16 and 17 maintain the corner gussets in flat position over the front and back wall panels.

Guideways 53 are machined into the lower portions of the corner posts. These guideways are slanted downwardly and inwardly so that a guide bar 54 fitted with friction reducing rollers 55 on its ends, and guided in the machine guideway, will move towards the plunger, while simultaneously also advancing parallel to the plunger axis.

The bar thus has a vertical component of motion which enables it to follow the moving plunger and a horizontal component of motion which causes it to move closer to the plunger as the plunger advances.

Figure 12:
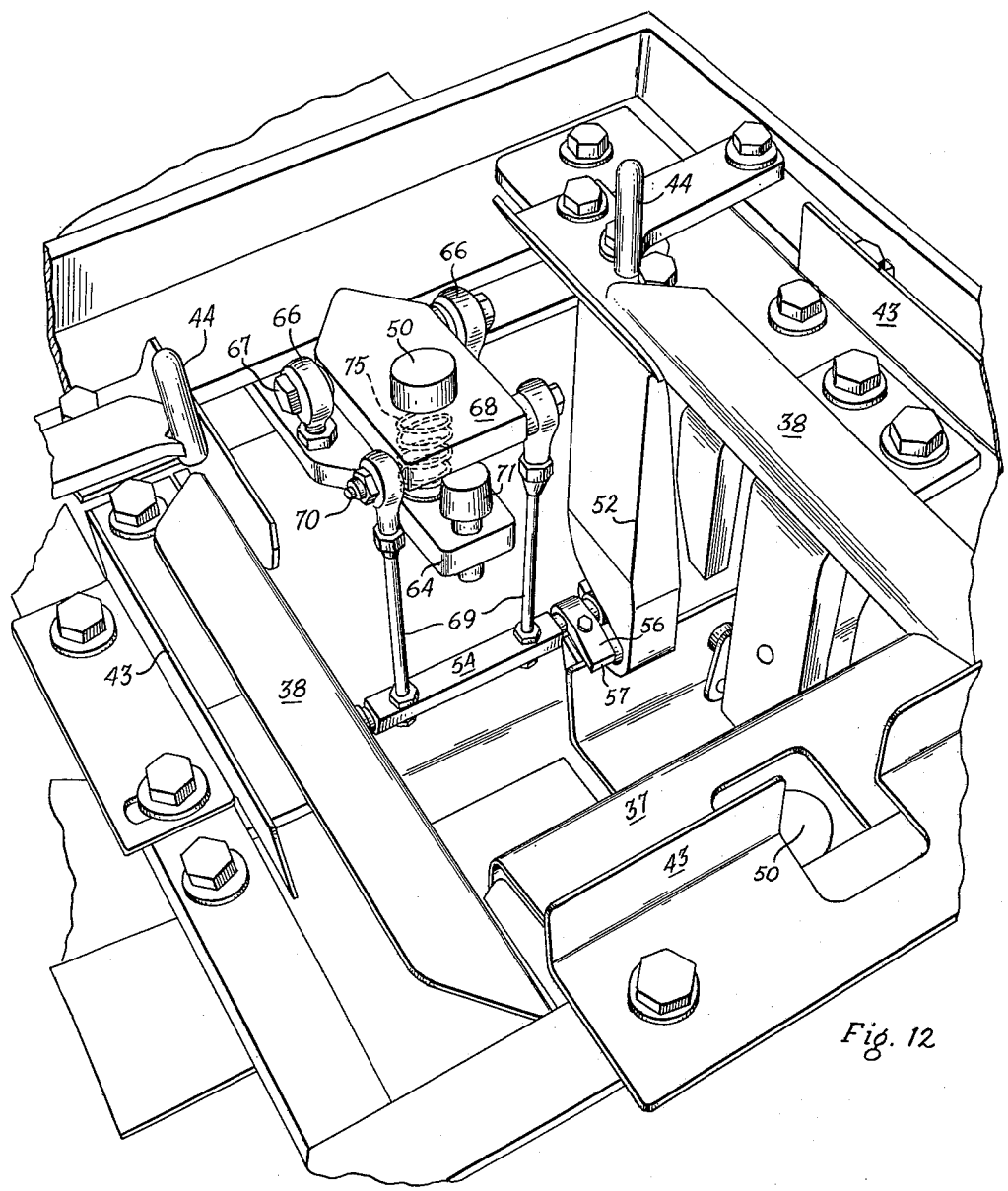
FIG. 12 is a perspective view of the die mechanism, a back wall folding element being removed to expose details of a lever mechanism for actuating the tucker element.

The guide bar carries two tucker fingers 56, one for each of the lock tabs 22 on the corner gussets. The shape of the fingers 56 is best seen in FIGS. 7 and 12 which show the fingers to have a blunt tab-engaging front face 57. Throughout the motion of the guide bar 54, the angle of inclination of the front face 57 does not change appreciably so that the tucker fingers are capable of exerting a substantial force on the lock tabs in order to force the tabs through the H-cut apertures in the cover panel and the front flange without permanently creasing the tabs. The finger 56 is narrower than the lock tab 22 and its width is approximately equal to the width of the neck of the tab as represented by the length of the tab fold line 23 (see FIG. 3).

FIG. 7 shows the guide bar 54 and the tucker fingers 56 in their normal rest position in which the fingers are completely withdrawn and the guide rollers 55 rest in the upper portion of the guideway 53. In FIG. 8 the fingers 56 have moved approximately half-way down the guideway 53, and their front faces 57 (FIG. 12) have come into contact with the lock tabs. At this moment the plunger 33 is still in downward motion.

Figure 9:
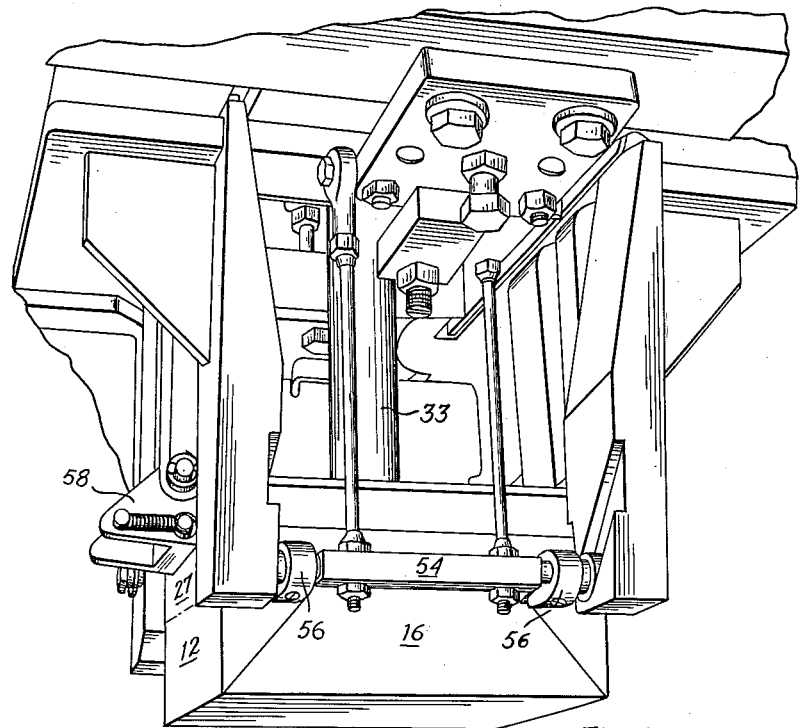

In the position shown in FIG. 9 the guide bar 54 with its tucker fingers 56 has reached its extreme position in which the front faces of the tucker fingers have moved beyond the plane of the front and back walls so that the lock tabs now extend into the recesses 36 of the plunger (see FIG. 4). At this moment the plunger 33 has reached its lowest position and return point.

The die is fitted with strip-off latches 58 (see FIG. 7), which are substantially triangular shaped pieces of steel pivoted at 59 and each latch is under action of a spring 60 which tends to pull the latch into a projected position in which its point 61 extends slightly into the path of the box and plunger. The point 61 is the portion of the latch which engages the blank. FIG. 7 shows the latch in its normal rest position from which the latch is deflected when a box moves down the die throat as shown in FIG. 8. In FIG. 9 the top edge of the dust flap 27 has just moved beyond the point 61 of the latch and the latch has snapped into engaging position above the dust flap so that the box cannot follow the plunger when the plunger moves upwardly. The plunger has vertical grooves 62 to clear the latch points. These grooves are best seen in FIGS. 3 to 5.

Figure 10:
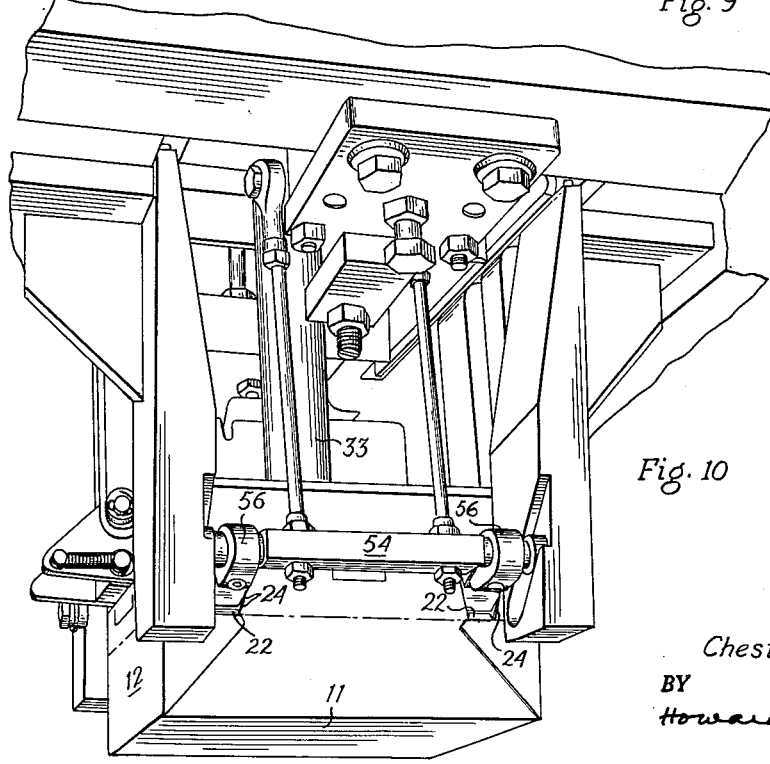
Figure 11:
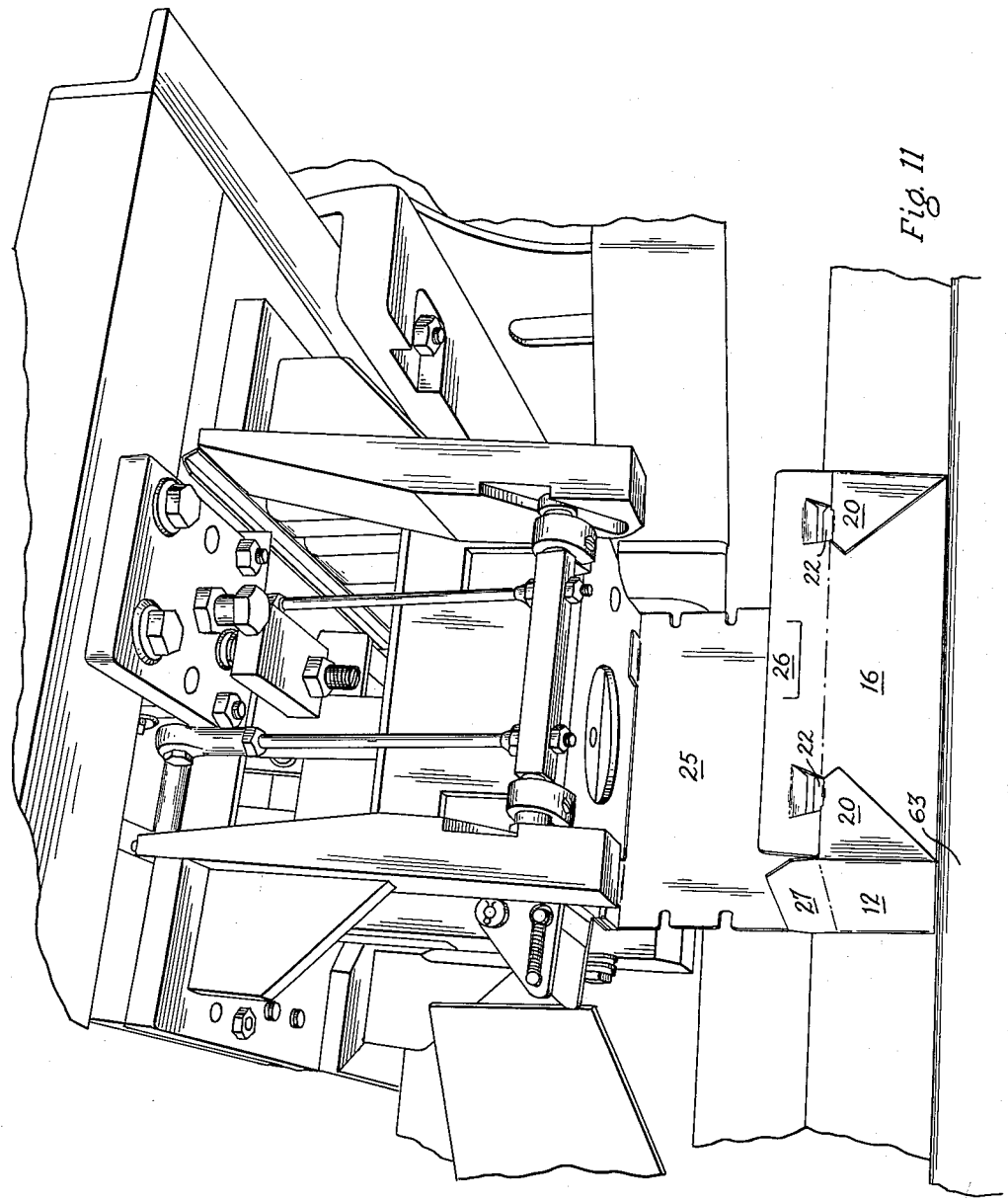

In FIG. 10 the plunger has begun its return stroke which is accompanied by a simultaneously return motion of the guide bar 54 and the tucker fingers 56. The fingers now clear the box which shows the lock tabs 22 forced through the apertures formed by the H-cuts 24. In the position shown in FIG. 10 the box is still frictionally held by the plunger, but drops onto a conveyor 63 as soon as the plunger 33 leaves the interior of the box body.

The actuating mechanism of the tucker fingers is best described by referring to FIGS. 12 and 7. A mounting plate 64 is secured to the under-side of the die frame 65 and carries a pair of posts 66 between which the pivot 67 of a lever 68 is mounted. The lever 68 carries the aforementioned nylon cap 50 which is struck by the studs 47 on the cross arm 46 of the plunger.

The lever 68 has a pair of push rods 69 articulated to it at a pivot axis 70. The lower ends of the push rods 69 are secured to the guide bar 54 which carries the tucker fingers 56. A resilient buffer 71 on the mounting plate 64 limits the downward movement of the lever 68 when it is depressed by the plunger. The vertical position of the buffer is adjustable by means of the threaded buffer stem 72 and the lock nut 73. The position of the guide bar 54 with respect to the lever 68 is also adjustably by lock nuts 74 above and below the guide bar 54. A helical compression spring 75 between the lever 68 and the plate 64 immediately in back of the buffer 71 and almost below the cap 50 normally maintains the lever in a raised position.

The machine may be operated at a high rate of speed due to the fact that the locking operation of the box is performed while the plunger performs its downward work stroke, whereafter the locking mechanism immediately releases the box so that the box may be discharged in a downward direction while the plunger makes its upward return stroke during which the next blank is deposited on the die.

What is claimed is:

1. A box folding and locking device, particularly for folding and locking the corners of a folding box having a box bottom, box sides, and a corner lock flap on a certain side having a tab thereon insertable into and aperture in another box side, the device comprising, a plunger having end surfaces and front and rear surfaces, one of said surfaces being provided with a recess; an open-bottom die through which said plunger is movable, said die having lateral blank folding portions extending substantially parallel to the front and rear surfaces of the plunger, and end blank folding portions substantially parallel to the end surfaces of the plunger, considering plunger and die in plan view; means forming a downwardly and inwardly inclined guideway mounted on said die below said folding portions; a finger element mounted on said die for movement in said guideways into and out of the recess of the plunger while following the downward work stroke and the upward return stroke of the plunger, respectively; and means operable in response to the movement of the plunger relatively to the die for moving said finger element within said guideway sufficiently far in one extreme position to flex said tab of the box blank through the blank aperture into the recesses of the plunger while the plunger passes said finger, and sufficiently far to clear the plunger in its other extreme position.

2. A box folding and locking device, particularly for folding and locking the corners of a folding box having a box bottom, box sides, and a corner lock flap on a certain side having a tab thereon insertable into an aperture in another box side, the device comprising, a plunger having end surfaces and front and rear surfaces, one of said surfaces being provided with a recess; an open-bottom die through which said plunger is movable, said die having lateral blank folding portions extending substantially parallel to the front and rear surfaces of the plunger, and end blank folding portions substantially parallel to the end surfaces of the plunger, considering plunger and die in plan view; means forming a downwardly and inwardly inclined guideway mounted on said die below said folding portions; a finger element mounted on said die for movement in said guideway into and out of the recess of the plunger while following the downward work stroke and the upward return stroke of the plunger, respectively; means operable in response to the movement of the plunger relatively to the die for moving said finger element within said guideway sufficiently far in one extreme position to flex said tab of the box blank through the blank aperture into the recesses of the plunger while the plunger passes said finger, and sufficiently far to clear the plunger in its other extreme position; and means on said die for engaging the top edge of the box and detaining the box in the die against the retracting motion of the plunger, said last named means being mounted in a position to engage the top edge of the box after said finger element has reached a projected position in which the tab has moved through the aperture.

3. A box folding and locking device, particularly for folding and locking the corners of a folding box having a box bottom, box sides, and a corner lock flap on a certain side having a tab thereon insertable into an aperture in another box side, the device comprising, a plunger having end surfaces and front and rear surfaces, one of said surfaces being provided with a recess; an open-bottom die through which said plunger is movable, said die having lateral blank folding portions extending substantially parallel to the front and rear surfaces of the plunger, and end blank folding portions substantially parallel to the end surfaces of the plunger, considering plunger and die in plan view; means forming a downwardly and inwardly inclined guideway mounted on said die below said folding portions; a tucker finger movable in said guideway; a lever mounted on said die; a push rod between said lever and said finger for moving said finger in said guideway upon deflection of the lever; means on the plunger for engaging and deflecting said lever in one direction; and a spring acting on the lever and finger urging the lever in the opposite direction.

References Cited in the file of this patent
UNITED STATES PATENTS
2,909,105 Lawrence _____ Oct. 20, 1959